Jan. 4, 1966 S. RUHMAN 3,228,010

RECORDING AND REPRODUCING CIRCUIT

Filed Sept. 19, 1960

INVENTOR:
Smil Ruhman

By Smyth, Roston & Pavitt

Attorneys.

3,228,010

RECORDING AND REPRODUCING CIRCUIT

Smil Ruhman, Los Angeles, Calif., assignor, by mesne assignments, to Raytheon Company, Lexington, Mass., a corporation of Delaware Filed Sept. 19, 1960, Ser. No. 56,881
20 Claims. (Cl. 340—173)

Figures 1, 2:
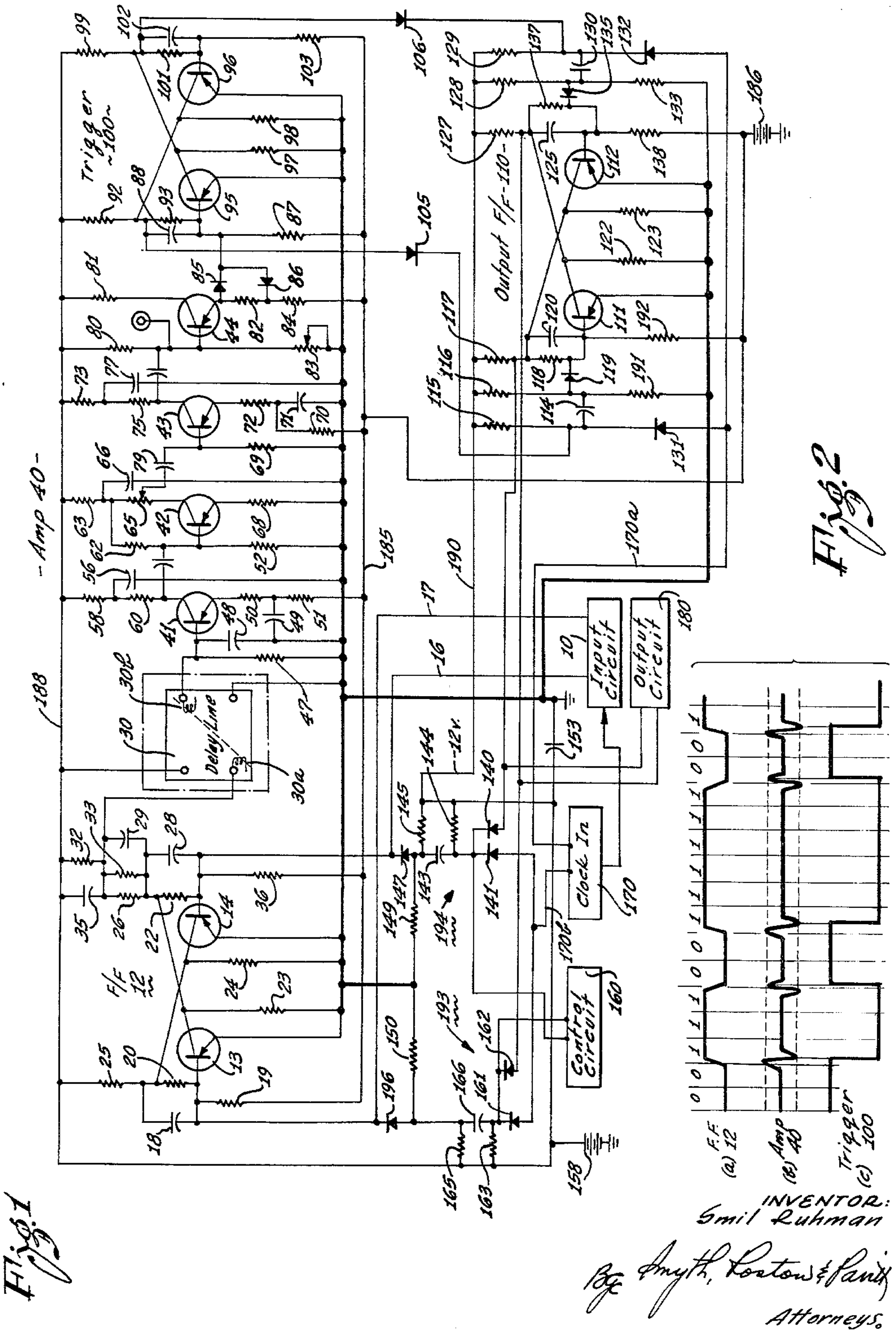

This invention relates to memory apparatus and, more particularly, to high speed memory apparatus which utilize delay lines as the memory medium.

In high speed computers and the like, magnetostrictive storage provides the most economical bit storage and, accordingly, is generally utilized for such applications. Utilizing magnetostrictive delay lines, a return-to-zero or RZ method is utilized because relatively long term decay effects cancel. This RZ method is referred to as the return-to-zero method because the current returns to zero between successive bits of information. Though the RZ method is the one utilized for magnetostrictive storage, there are applications in which the NRZ, or non-return-to-zero, method would be highly desirable if it could be utilized. In the non-return-to-zero method, the current occupies a full bit and the pulses lose their individuality because the current does not return to zero between successive similar digits.

A typical application where the NRZ method for the magnetostrictive storage is desirable is in high speed digital computers. Since the current reversals occur at a maximum of once per bit in the NRZ method instead of twice per bit in the RZ method, the bit density and the frequency is double that provided by the RZ method. In one particular application, the bit rate or speed of the computer may be as high as 2 megacycles per second. Such speeds have heretofore been unachievable because the RZ method has been utilized. Further, in computers the bit information is conventionally handled in the NRZ method due to the use of flip-flops throughout the computer and a conversion is necessary in order to utilize the RZ magnetostrictive memory or storage. If an NRZ magnetostrictive memory could be provided, it would be more compatible with the rest of the computer.

In a specific illustrative embodiment, a memory apparatus is provided utilizing a magnetostrictive delay line and wherein the non-return-to-zero method is utilized. The apparatus is a high speed apparatus, operable at bit rates up to 2 megacycles per second, without loss of accuracy due to the utilization of the NRZ method.

A writing flip-flop circuit is connected to the input of a high quality magnetostrictive delay line for introducing a pulse thereto each time it changes state indicative of a dissimilarity of successive bits. Each input current step to the magnetostrictive line causes a di-pulse in the receiver coil of the line, with a predetermined time interval being provided between the positive and negative peaks of the di-pulse. Input current steps in opposite directions provide for di-pulses of opposite sign. The di-pulses from the magnetostrictive line are amplified and introduced to a trigger circuit arrangement.

Features of this invention pertain to the provision of means for unambiguously reading the digital information from the delay line. An inaccuracy does not destroy the accuracy of succeeding bits because the signal itself is utilized to determine the bit identity and the determination does not depend upon the identities of preceding bits. Circuit means, including the trigger circuit arrangement, automatically reassumes a correct state after any bit inaccuracy. The peaks of the amplified di-pulses are provided through threshold gating means to the trigger circuit arrangement. The second pulse of each di-pulse is effective to trigger the arrangement because the first pulse of each di-pulse is of the same polarity as the second pulse of the preceding di-pulse.

Means are provided for sampling the trigger circuit arrangement at the bit rate with the sampling being centrally positioned with respect to the duration allotted to each bit. The sampled pulses, in NRZ form, may be recycled through a gating circuit and the input or writing flip-flop circuit back to the magnetostrictive delay line. A control circuit is provided for controlling the recirculation of the digital information.

Further advantages and features of this invention will become apparent upon consideration of the following description when read in conjunction with the drawing wherein:

FIGURE 1 is a partial circuit and partial functional representation of the memory apparatus of this invention; and FIGURE 2 is a series of curves illustrating the operation of the memory apparatus of this invention.

Referring to FIGURE 1, digital information in binary form may be introduced from an input circuit 10 to two input leads 16 and 17 connected to the opposite sides of a write flip-flop circuit 12. The binary input information from the circuit 10 may be in a non-return-to-zero or NRZ form. The input circuit 10 may include means, not shown, for providing a positive pulse on the lead 16 for a 1 binary digit, and a positive pulse on the lead 17 for a 0 binary digit. The circuit 12 is bistable and a positive pulse on the lead 16 sets it to one of its bistable conditions, and a positive pulse on the lead 17 resets it back to its other bistable condition. The circuit 10 may be controlled by a clock input circuit 170 which is hereinafter described. As is also hereinafter described, a flip-flop output circuit 110 is sampled by the circuit 170 in synchonization with the circuit 10.

The flip-flop circuit 12 includes two transistors 13 and 14, illustratively, of the type designated 2N1500, with one or the other being conductive. The transistor 13 is conductive responsive to a negative input pulse on the lead 17 to indicate a 1 digit, and the transistor 14 is conductive responsive to a negative pulse on the lead 16 to indicate a 0 digit. Curve (*a*) of FIGURE 2 illustrates the output of the flip-flop circuit 12 for a succession of binary digital information.

In the flip-flop circuit 12 the two transistors 13 and 14 have their respective collector electrodes interconnected to their base resistors 20 and 22. The emitter electrodes of the transistors 13 and 14 are connected to a ground lead 38, and the base electrodes of the transistors 13 and 14 are connected respectively by the resistors 19 and 36 to a positive potential lead 185. The lead 185 is connected to a battery 186, illustratively, providing a potential of plus six volts. The collector electrodes of the transistors 13 and 14 are biased from a negative potential source 158, with the collector electrode of the transistor 13 being connected through two resistors 26 and 33, connected in parallel, and a resistor 32 to a negative potential lead 188 extending from the source 158. The collector electrode of the transistor 14 is connected by a resistor 25 to the potential lead 188. The resistor 25 is part of a voltage divider network including the resistor 20 and a resistor 19 coupled between the sources 158 and 186. The resistor 20 is shunted by a capacitor 18 and the resistor 22 is shunted by a capacitor 28 which increase the switching speed of the flip-flop circuit 12.

When the transistor 13 is conductive, a relatively positive potential is provided from the collector of the transistor 13 to a megnetostrictive delay line 30 and when the transistor 13 is non-conductive, a relatively negative potential is applied thereto. In the delay line 30, current flow through the transmitting transducer 30*a* generates a stress wave traveling towards the receiving transducer 30$b$. At the receiving transducer 30$b$, the stress wave causes an induced voltage to appear across the transducer 30$b$. A change of input potential or current from one level to another provides for a di-pulse in the receiver transducer 30$b$ of the delay line 30 of the type illustrated in curve ($b$) of FIGURE 2. The polarity of the first pulse of each di-pulse is positive when the input current increases or becomes more positive and is negative when the input current decreases or becomes more negative. The reverse polarities are provided for the second pulse of each di-pulse. The interval between the two pulses of each di-pulse is determined by the geometry of the transducers in the delay line 30. The output potential from the delay line 30, accordingly, is a di-pulse which indicates by its polarity the direction of the change of input current to the delay line 30. The delay provided by the line 30 may, illustratively, be 3 milliseconds and the bit rate of the memory apparatus may be 2 megacycles so that approximately 6,000 bits can be simultaneously present in the delay line 30 $(6{,}000/2\times10^6)=.003$.

The input potential to the delay line 30 from the flip-flop circuit 12 may illustratively change by 4 volts peak-to-peak when the circuit 12 is triggered. The di-pulses through the delay line 30 are attenuated at the transducers 30$a$ and 30$b$ so that the output magnitudes from the transducer 30$b$ may, illustratively, be only 3 millivolts. The attenuation does not depend upon the length of the line 30. A magnetostrictive delay line of this general type is the delay line designated L40 manufactured by Ferranti Electric, Inc. of Hemstead, New York. Additional information as to the L40 delay line may be had by reference to a February, 1958, brochure entitled Magnetostriction Delay Lines L20, L30, L40, published by Ferranti Electric, Inc., Electronics Division, 95 Madison Ave., Hempstead, L.I., N.Y.

The information provided through the delay line 30 is in the NRZ form because the flip-flop circuit 12 is operated in accordance with the non-return-to-zero method, and a di-pulse is transmitted through the line only when a change of input information occurs. The di-pulses from the delay line 30 are provided through an amplifier chain 40 having three transistors 41, 42 and 43. As is hereinafter described, an emitter follower circuit including a transistor 44 is coupled to the output of the amplifier chain 40. The amplifier arrangements or stages including respectively the transistors 41, 42 and 43, are substantially similar and function to increase the magnitude of the di-pulses from approximately 3 microvolts to approximately 2.2 volts. The transistors 41, 42 and 43 are transistors, illustratively, of the type designated 2N1500.

The di-pulses from the delay line 30 are provided directly to the base electrode of the transistor 41 which is the first transistor in the amplifier chain. The base electrode of the transistor 41 is connected by a base resistor 47, shunted by a capacitor 48 to the ground lead 38. Bias potential is provided to the collector electrode of the transistor 41 through two serially connected resistors 58 and 60. The junction between the two resistors 58 and 50 is coupled by a capacitor 56 to the ground lead 38. The emitter electrode is positively biased over a path through two serially connected resistors 50 and 51 from the potential source 186. The junction between the resistors 50 and 51 is coupled by a capacitor 49 to the ground potential lead 38.

The di-pulse at the collector electrode of the transistor 41 is coupled through a capacitor 54 to the base electrode of the transistor 42, which is also coupled to the lead 38 by a resistor 52. A base bias potential is provided from the source 158 through resistors 63 and 62 which are serially connected with the resistor 52 between the source 158 and ground. The emitter electrode of the transistor 42 is connected by a resistor 58 to the lead 38. A potentiometer 65 connected between the collector electrode of the transistor 42 and the resistor 63 is utilized to adjust the magnitude of the signal provided from the collector electrode of the transistor 42 through a coupling capacitor 67 to the base electrode of the transistor 43. The junction between the resistor 63 and the potentiometer 65 is connected to ground by a capacitor 66. The base electrode of the transistor 42 is connected to ground by a resistor 69. The collector electrode of the transistor 43 is biased over a path through two resistors 73 and 75 from the battery 158, and the emitter electrode is biased over a path through two resistors 72 and 70 from the battery 186. The resistor 72 is also coupled to ground by a capacitor 71, and the junction between the resistors 73 and 75 is connected by a capacitor 77 to the ground lead 38.

The amplified and phase reversed di-pulse from the amplifier chain are coupled from the collector electrode of the transistor 43 through the capacitor 79 to the base electrode of the transistor 44. The transistor 44 is part of an emitter follower circuit connected to the end of the amplifier chain. The base electrode of the transistor 44 is biased over a path from the battery 158 through a resistor 80 and a potentiometer 83 to the lead 38. The bias potential may be adjusted by the potentiometer 83. The collector electrode is biased from the battery 158 through a resistor 81.

The output from the transistor 44 is taken from its emitter electrode and from the junction between two serially connected resistors 82 and 84 coupled from the emitter electrode to ground. A gating arrangement including two diodes 85 and 86 couple the emitter follower circuit to a trigger circuit arrangement 100 which identifies the digits and which converts the di-pulse form of information back to the non-return-to-zero or NRZ form of information. The polarity of the di-pulses at the emitter electrode of the transistor 44 is opposite to that depicted in curve ($b$) of FIGURE 2 due to the phase reversal through the amplifier 40. The trigger circuit 100, essentially, is a flip-flop circuit which is operated by the second pulse of each di-pulse from the emitter follower transistor 44. The diodes 85 and 86 provide for a threshold response for positive and negative pulses exceeding in magnitude approximately 4.4 volts. In this way, the diodes 85 and 86 prevent the passage of any signals between the peaks of the di-pulses at the output of the amplifier chain. The threshold gate arrangement effectively removes noise pulses or disturbances of magnitudes between $\pm$ 1 volt.

The circuit 100 includes two transistors 95 and 96, one or the other of which is conductive. Independent of which transistor in conductive, the potential at the junction of the two diodes 85 and 86 remains effectively the same at approximately ground potential. Both diodes 85 and 86 are, accordingly, reverse-biased during either quiescent condition of the two transistors. Normally, the potential at the anode of the diode 85 is approximately +1 volt, and at the cathode of the diode 86 is approximately $-1$ volt so that each diode is reverse-biased by approximately 1 volt.

Assume for the moment that the transistor 95 is conductive and that the transistor 96 is non-conductive. The next di-pulse through the amplifier chain is indicative of a change from a 0 digit to a 1 digit. Due to the phase reversal through the three-stage amplifier chain 40, the di-pulse consists of a negative pulse followed by a positive pulse, instead of a positive pulse followed by a negative pulse as depicted in curve ($b$) of FIGURE 2.

The part of the negative pulse or first half of the di-pulse which exceeds the 1 volt threshold passes through the forward biased diode 86 to the base electrode of the transistor 95. The transistor 95, however, is conductive at this time so that the negative pulse has no effect. When the positive pulse is received at the emitter follower, the part exceeding plus 1 volt is coupled through the diode 85 to reverse-bias the emitter-to-base junction of the transistor causing the transistor 95 to become non-conductive and the transistor 96 to become conductive indicative of a 1 binary digit registration. As indicated above, the magnitude of each half of the di-pulse is approximately 2.2 volts.

The potential at the base electrode of the transistor 95 is determined by a voltage divider arrangement including three serially connected resistors 92, 93 and 87 coupled between the negative source 158 and the positive source 186. When the transistor 95 is conductive, it provides a low impedance path from the diodes 85 and 86 to ground to produce a very slight relatively negative potential at the cathode of the diode 85. When the transistor is non-conductive, a very slight positive potential exists at its base electrode. For both of these conditions, the potential may be considered to be zero.

With both diodes 85 and 86 reverse-biased during either quiescent condition of the circuit 100, noise at potentials between +1 volt have no effect. Further, high frequency or sharp disturbances exceeding +1 volt also have no effect as the trigger circuit 100 requires a predetermined minimum amount of energy for triggering. An integration of the input signal is, accordingly, in effect to trigger the circuit 100.

The collector electrodes of the two transistors 95 and 96 are inter-coupled in a similar manner as that described above for the flip-flop circuit 12. The collector electrode of the transistor 96 is connected to the junction between the resistors 92 and 93 and the collector electrode of the transistor 95 is connected between the junction of two resistors 99 and 101. The collector electrodes are also coupled respectively to the ground potential lead 38 by the resistors 97 and 98, and the emitter electrodes are directly coupled to the lead 38. The resistor 93 is shunted by the capacitor 88, and the resistor 101 is shunted by the capacitor 102.

The operation of the trigger circuit arrangement 100 is unambiguous because a specific state is provided for each of the two binary digits. In the event of an inaccuracy, the operation of the circuit 100 is self-corrective because its condition is determined by the second pulse of each di-pulse. The reason that the trigger circuit 100 is operated by the second pulse of each di-pulse is because the first pulse is similar in polarity to the second pulse of the preceding di-pulse unless there is an error.

Assume, for the moment, that the trigger circuit 100 is in a 1 binary condition when it should really be in a 0 binary condition. This inaccuracy is automatically corrected and the circuit 100 is set to its proper condition by the next di-pulse. Normally, as indicated above for a 0 binary condition, the transistor 95 in the circuit 100 is conductive. For the inaccuracy the transistor 95 is then assumed to be non-conductive so as to be in a 1 binary condition instead of a 0 binary condition.

The next di-pulse indicates a change in condition from the 0 binary condition to the 1 binary condition. The first pulse is, therefore, negative, and since the transistor 95 is non-conductive, the negative peak is coupled through the diode 86 to trigger the circuit 100 causing the transistor 95 to become conductive. The positive second pulse of the di-pulse, however, thereupon returns the transistor 95 to its non-conductive condition and the trigger circuit 100 back to its 1 binary condition. The inaccuracy, accordingly, has been corrected due to the double operation of the circuit 100 by the di-pulse instead of its normally single operation thereby.

The information provided by the trigger circuit 100 is in NRZ form and illustrated in curve (*c*) in FIGURE 2. The timing of the NRZ information from the trigger circuit 100 may not be accurately synchronized with the input information provided to the write flip-flop circuit 12. The inaccuracies in the timing of the circuit 100 are due to variations in the delay of the magnetostrictive line 30 due to temperature variations or noise or reflections in the line. Further, at high speeds such as 2 megacycles per second, the pulses in the delay line may be quite close together and the recovery of the line therebetween may be poor. At high speeds, the timing is affected by the recovery. In order to provide for an NRZ output which is synchronized with the input information and the rest of the computer, not shown, which may include the memory apparatus of FIGURE 1, an output or read flip-flop circuit 110 is provided. Under control of the clock pulses from the circuit 170, the circuit 110 samples the NRZ output of the trigger circuit 100 in synchronization with the clock circuit 170 and the circuit 10 which is also synchronized by the clock pulses.

Another reason for utilizing the read or output circuit 110 is that the trigger circuit 100 is a fairly sensitive device and unsuitable for driving a number of other circuits. The output flip-flop circuit 110 need not be as sensitive and can provide sufficient power for driving other circuits, not shown, included in an output circuit 180.

A Schmitt trigger circuit may be utilized instead of the flip-flop type trigger circuit 100 to develop the NRZ digital signals from the di-pulse signals but a standardized output is then not provided. The trigger circuit 100 provides for a standard voltage output to the output flip-flop circuit 110.

The trigger circuit 100 is sampled by the output circuit 110 under control of the member clock pulses supplied from the clock input circuit 170 through a lead 170*a* to the output circuit 110. The circuit 170, as briefly mentioned above, also controls the operation of the input circuit 10. The memory clock pulses may be negative pulses, each having a duration of 0.15 microsecond and a repetition rate of 2 megacycles. The clock input circuit 170 also supplies computer clock pulses to a lead 170*b*, which pulses also have a repetition rate of 2 megacycles per second but the pulse duration is 0.25 microsecond. As is hereinafter described, the computer clock pulses are utilized to gate the output NRZ information from the output circuit 110 back to the write flip-flop circuit 12.

The output circuit 110 includes two transistors 111 and 112 which are connected in a flip-flop arrangement similar to that described above for the trigger circuit 100. The emitter electrodes of the transistors 111 and 112 are connected to ground and their collector electrodes are connected respectively by resistors 123 and 122 to ground. The base electrode of the transistor 111 is connected by a resistor 118 shunted by a capacitor 120 to the collector electrode of the transistor 112 and, the base electrode of the transistor 112 is connected by a resistor 137 shunted by a capacitor 125 to the collector electrode of the transistor 111. The two transistors 111 and 112 may be junction transistors of the type designated 2N1500. The biasing circuit arrangement for the base electrode of the transistor 112 includes a resistor 127, the resistor 137 and a resistor 138 which are serially connected between a minus 12 volt lead 190 and the positive potential source 186. The lead 190 is connected to the collector electrode of the transistor 112 by a resistor 117 and by a resistor 127 to the collector electrode of the transistor 111. Due to the interconnection of the two transistors 111 and 112, one or the other of the two transistors is conductive at any time.

Assume that the transistor 95 in the trigger circuit 100 is non-conductive and that the transistor 96 is conductive. For this condition, the trigger circuit 100 registers a binary digit 1. With the transistor 95 non-conductive, a relatively negative potential is at its collector electrode so that a diode 106 coupled thereto is reverse biased. A diode 105 connected to the collector electrode of the transistor 96, on the other hand, is forward biased. The diode 105 and a diode 131 connected from the circuit 170 form one AND gate, and the diode 106 and a diode 132 also connected from the circuit 170 form a second AND gate. When both diodes of one of the AND gates are reverse-biased, a positive pulse is developed at the trailing edge of the clock pulse which is coupled to the base electrode of the associated transistor in the output flip-flop circuit 110.

With the diode 106 reverse-biased when the next memory clock pulse is provided through the lead 170*a*, the junction between the diodes 106 and 132 goes negative. The trailing edge of the pulse provides for a pulse through the capacitor 130 and a diode 135 to the base electrode of the transistor 112 causing it to become non-conductive. The anode of the diode 135 is coupled to the junction between two resistors 128 atnd 133, and the cathodes of the diodes 132 and 106 are connected by a resistor 129 to the lead 190. To indicate a 1 binary condition, the transistor 112 is, accordingly, non-conductive and it in turn causes the transistor 111 to become conductive due to the interconnection of the two transistors 112 and 111. The output flip-flop circuit 110 remains in this condition as long as the trigger circuit 100 remains set to its binary condition 1 with its transistor 95 non-conductive and its transistor 96 conductive. Each memory clock pulse provides for a positive pulse to the base electrode of the transistor 112 which, of course, remains non-conductive.

If the condition of the trigger circuit 100 changes, so that the transistor 95 becomes conductive, the gating potentials to the diodes 105 and 106 are reversed to unblock the path to the base of the transistor 111 and to block the path of the pulse to the base of the transistor 112. The next memory clock pulse, accordingly, provides for a positive pulse at its trailing edge through a capacitor 114 and a diode 119 to the base electrode of the transistor 111 to reverse the conductive conditions of the transistors 111 and 112. The cathode of the diode 131 is connected by a resistor 15 to the lead 190 and the anode of the diode 119 is connected to the junctions between two resistors 116 and 190 and ground. The base biasing circuit includes a resistor 117, the resistor 118 and a resistor 192 coupled between the lead 190 and battery 186.

The output from the circuit 110 is provided from the collector electrodes of the transistors 111 and 112 to two AND gates 193 and 194. More specifically, the collector electrode of the transistors 111 is connected to a diode 162 in the AND gate 193 and the collector electrode of the transistor 112 is connected to a diode 140 in the AND gate 194. Each of the AND gates 193 and 194 has three inputs; one from the output flip-flop circuit 110, one from the clock input circuit 170, and one from a recirculating control circuit 160. The control circuit 160 provides enabling potentials to recirculate the information from the output circuit 110 back to the flip-flop circuit 12. The computer clock pulses from the clock input circuit 170 are synchronized, as described above, with the memory clock pulses from the circuit 170 and are utilized in equipment, not shown, in the computer apparatus which includes the memory circuit of this invention. Due to the sampling procedure, the information is delayed by one bit time in its passage from the trigger circuit 100 back to the flip-flop circuit 12. An additional delay of one bit time is provided to the output of the circuit 12. For 6,000 bit recirculation, 5998 bits are in the delay line 30 and two bits are in the flip-flop circuits 110 and 12. The delay provided in the recirculation between the trigger circuit 100 back to the line 30 is such as to enter the first bit to the line 30 immediately after the last bit is entered thereto.

Assume that the output circuit 110 has been set to its 1 binary condition so that its transistor 111 is conductive and the transistor 112 is non-conductive. With the transistor 111 conductive, and the transistor 112 non-conductive, a negative input potential is provided to the AND gate 194 but not to the AND gate 193. The diode 140 is, accordingly, reverse biased and the diode 162 is forward biased. When the computer clock pulse is received, the AND gate 194 is enabled to couple a pulse through a capacitor 143 to reverse bias a diode 147 which is connected to the base electrode of the transistor 14 in the flip-flop circuit 12. Biasing potential is provided from the lead 190 to the cathodes of the diodes 140 and 141 in the AND gate 194 and directly from the battery 158 through the resistors 163 to the diode 162 and 161 in the AND gate 193. The diode 147 is biased by a connection from the lead 190 through the resistor 145 and a resistor 149 to ground. Similarly, the diode 196 at the output of the AND gate 193 is biased by a connection including a resistor 165 and a resistor 150 connected between the battery 158 and ground.

In this manner, when the output circuit 110 is in its 1 binary condition with its transistor 112 non-conductive, a pulse is provided through the gate 194 to reverse bias the diode 147 and turn off the transistor 14. The transistor 14, accordingly, becomes non-conductive and the transistor 13 becomes conductive to indicate the 1 binary condition in the flip-flop circuit 12.

The sequence continues in this manner with the sampled information at the output circuit 110 being coupled through the gates 193 and 194 to set or reset the flip-flop circuit 12 in accordance therewith. If the enabling potentials are removed by the control circuit 160, the recirculation of the information is inhibited. The input information can be entered from the circuit 10 when the recirculation is inhibited. The binary information from the trigger circuit 110 is continuously provided from the respective collector electrodes of the transistors 111 and 112 to the output circuit 180, mentioned above, which symbolizes the auxiliary computer equipment, not shown. The information is continuously provided to the output circuit 180 independent of the condition of the gates 193 and 194.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A memory apparatus for binary digital information of the non-return-to-zero type, including, circuit means for supplying binary signals in non-return-to-zero form whereby the level of the binary signals changes when successive binary digits differ, a magnetostrictive delay line coupled to said circuit means for receiving the binary signals and for developing a di-pulse in response to each change in the level of the binary signals where each di-pulse includes a first pulse with a first polarity indicative of the direction of the change in the level of the binary signal and includes a second pulse with a second polarity opposite to the first polarity, means including a threshold responsive gating circuit coupled to said delay line for passing only the pulse peaks of opposite polarity in each di-pulse, means including a bistable triggering circuit coupled to said gating circuit and having first and second states of operation and responsive to the particular sequence of the polarities of the two pulses in each di-pulse for obtaining an operation of the triggering circuit to a particular one of the first and second states and for locking the bistable circuit to indicate the successive binary digits represented by the binary signals, in accordance with the sequence of the polarities of the pulses in each di-pulse.

2. A memory apparatus for binary digital information of the non-return-to-zero type, including circuit means for supplying binary signals in non-return-to-zero form whereby a change in the level of the binary signals occurs when successive binary digits differ, means including a magnetostrictive delay line coupled to said circuit means for receiving the binary signals and for developing a di-pulse in response to each change in the level of the binary signals, where each di-pulse includes a first pulse with a first polarity indicative of the direction of the change in the level of the binary signals and includes a second pulse with a second polarity opposite to the first polarity, means including a threshold responsive gating circuit coupled to said delay line for passing only the pulse peaks of opposite polarity in each di-pulse, means including a bistable triggering circuit coupled to said gating circuit and having first and second states of operation and responsive to the particular sequences of the two pulses in each successive di-pulse for triggering the bistable triggering circuit between the first and second states of operation and for locking the bistable circuit in response to the sequence of the pulses in each di-pulse to indicate the binary digits as represented by the binary signals, and means coupled to the binary triggering circuit for obtaining the production at multiples of a particular period of time of first and second output signals respectively representing the operation of the bistable circuit in the first and second states.

3. A memory apparatus, including, a bistable circuit having two operating conditions, means coupled to said bistable circuit for supplying binary digital signals to said circuit for operating said circuit to one condition in response to binary signals indicating a difference between successive digits in one direction and for operating said circuit to its other condition in response to binary signals indicating a difference between successive digits in the opposite direction, a delay line coupled to said bistable circuit and including means for developing a di-pulse in response to each operation of said circuit, where each di-pulse includes a first pulse of one polarity and a second pulse of opposite polarity and where the sequence of the polarities of the two pulses in each di-pulse is indicative of the operation of said circuit in said one and said other conditions, and output means coupled to said delay line and responsive to the sequence of the polarities of the two pulses in each di-pulse for converting the successive di-pulses received through said delay line to binary signals corresponding in timed relationship to the signals provided from said bistable circuit and for locking the output means in response to the sequence of the pulses in each di-pulse to obtain the response of the output means only to a particular one of the pulses in each di-pulse.

4. A memory apparatus for binary digital information of the non-return-to-zero type, including, circuit means for supplying binary signals in non-return-to-zero form whereby a change in the level of the binary signals occurs when successive binary digits differ, means including a magnetostrictive delay line coupled to said circuit means for receiving the binary signals and for developing a di-pulse in response to each change in the level of the binary signals, where each di-pulse includes a first pulse having a first polarity indicative of the direction of the change of the binary signals and includes a second pulse of second polarity opposite to the first polartiy, means including a threshold responsive gating circuit coupled to said delay line for passing only the pulse peaks of opposite polarity in each di-pulse, means including a bistable trigger circuit having first and second states of operation and coupled to said gating circuit and responsive to the particular sequence of the polarities of the successive pulses in each di-pulse for triggering the bistable trigger circuit between the first and second states and for locking the trigger circuit in response to the sequence of the polarities of the pulses in each di-pulse to obtain the response of the trigger circuit only to a particular one of the pulses in each di-pulse, means coupled to said trigger circuit and synchronized with the presentation of the binary signals by said circuit means for sampling said trigger circuit to obtain the production of output signals corresponding to the operation of the trigger circuit in the first and second states and in timed relationship with the binary signals, and means coupled to said sampling means for introducing the sampled signals back to said circuit means for recirculating the binary information through said delay line.

5. A memory apparatus, including, a bistable circuit having two operating conditions, first means coupled to said circuit for supplying binary digital signals to said circuit to obtain an operation of said circuit in one condition in response to binary signals indicating a first binary value and to obtain an operation of said circuit in the other condition in response to binary signals indicating a second binary value, means including a delay line coupled to said first means for developing a di-pulse in response to each change in the operation of said circuit between the two operating conditions where each di-pulse includes two successive pulses of opposite polarities and where the sequence of the polarities of the pulses in each di-pulse is indicative of the particular change in the operating condition of said first means, and means coupled to said delay line for converting the successive di-pulses passing through said delay line to binary signals having characteristics corresponding to the first and second operating conditions of said stable circuit, said converting means including circuit means responsive to the particular sequence of the polarities of the pulses in each di-pulse for locking on a particular one of the pulses in each sequence to inhibit the production of errors.

6. A memory apparatus, including, a bistable circuit having two operating conditions, means coupled to said bistable circuit for supplying binary digital signals to said circuit to obtain an operation of said circuit in one condition in response to binary signals indicating a first binary value and to obtain an operation of said circuit in the other condition in response to binary signals indicating a second binary value, means including a magnetostrictive delay line coupled to said bistable circuit for developing a di-pulse in response to each operation of said circuit where each di-pulse includes a sequence of first and second pulses of opposite polarities and where the sequence of the polarities of the pulses in each di-pulse is indicative of the particular change in the operating condition of the binary circuit, means including a threshold responsive gating circuit coupled to said delay line for passing only the pulse peaks of opposite polarity in each di-pulse, and means including a bistable trigger circuit coupled to said gating circuit and having first and second states of operation and responsive to the particular sequence of the polarities of the pulses in each di-pulse to become triggered between the first and second states of operation in a pattern corresponding to the sequence of the polarities of pulses in each di-pulse and to become triggered in response to only a particular one of the two pulses in each di-pulse.

7. A memory apparatus, including, a bistable circuit having two operating conditions, first means coupled to said circuit for supplying binary digital signals to said circuit for operating said circut in one condition in response to binary signals indicating a first binary value and for operating said circuit in its other condition in response to binary signals indicating a second binary value, means including a magnetostrictive delay line coupled to said circuit for developing a di-pulse in response to each operation of said circuit where each di-pulse includes a sequence of first and second pulses and where the sequence of the polarities of the pulse in each di-pulse is indicative of the particular change in the operating condition of the circuit, means including a threshold responsive gating circuit coupled to said delay line for passing only the pulse peaks of opposite polarity in each di-pulse, means including a bistable trigger circuit coupled to said gating circuit and having first and second states of operation and responsive to a particular one of the pulses in each di-pulse to become triggered from one bistable condition to the other, means coupled to said trigger circuit and synchronized with said first means for sampling said trigger circuit in synchronism with the supply of the binary digital signals from the first means to obtain the production of output signals in accordance with the bistable condition of the bistable trigger circuit and to correct for any variations in delay in said delay line, and means coupled to said sampling means and to said bistable circuit for introducing the output signals back to said bistable circuit to obtain a recirculation of the binary information through said delay line.

8. A memory apparatus, including, means including a magnetostrictive delay line for developing a di-pulse in response to each voltage pulse introduced to the line, where each di-pulse includes a pair of pulses of opposite polarity in a sequence and where the sequence of the polarity of the pulses in each di-pulse is dependent upon the polarity of the voltage pulse introduced to the delay line, a source of voltage pulses and coupled to said delay line for introducing voltage pulses to said line where each voltage pulse has a polarity indicative of a binary value, and means coupled to said delay line for receiving the di-pulses developed in said delay line and for determining the sequence of the polarity of the pulses in each di-pulse and for providing an output indication in accordance with such determination to provide an output indication of the binary value.

9. A memory apparatus, including, means including a magnetostrictive delay line for developing a di-pulse in response to each voltage pulse introduced to the line, where each di-pulse includes a pair of pulses of opposite polarity in a sequence and where the sequence of the polarity of the pulses in each di-pulse is dependent upon the polarity of the voltage pulse introduced to the delay line, a source of voltage pulses and coupled to said line for introducing voltage pulses to said line where the polarities of the voltage pulses indicate a binary value, and means coupled to said delay line for determining the sequence of the polarity of the pulses in each di-pulse, said last mentioned means including threshold responsive means coupled to said line for passing only the pulses in each di-pulse and including triggering means coupled to said threshold responsive means and having first and second conditions and triggered to the first condition for a first sequence of the polarity of the pulses in each di-pulse and triggered to the second condition for an opposite sequence of the polarity of the pulses in each di-pulse.

10. A memory apparatus, including means including a magnetostrictive delay line for developing a di-pulse in response to each voltage pulse introduced to the line, where each di-pulse includes a pair of pulses of opposite polarity and where the sequence of the polarity of the pulses in each di-pulse is dependent upon the polarity of the voltage pulse introduced to the line, a source of voltage pulses and coupled to said delay line for introducing voltage pulses to the line where the polarities of the voltage pulses indicate a binary value, means coupled to said delay line for determining the sequence of the polarity of the pulses in each di-pulse, said last mentioned means including threshold responsive means coupled to said delay line for passing only the pulses in each di-pulse and including triggering means coupled to said threshold responsive means and having first and second conditions and responsive to the pulses passing through the threshold responsive means to become triggered to the first condition for a first sequence of the polarity of the pulses in each di-pulse and to become triggered to the second condition for a second sequence of the polarity of the pulses in each di-pulse, the threshold responsive means including a pair of unidirectional members connected in an opposed relationship between the di-pulse developing means and the triggering means, and means coupled to said triggering means and synchronized with the introduction of voltage pulses from said source for periodically sampling the condition of said triggering means.

11. A memory apparatus for binary digital information of the non-return-to-zero type, including, circuit means for supplying binary signals in non-return-to-zero form whereby a change in the level of the binary signals between first and second levels occurs when successive binary digits differ, means including a magnetostrictive delay line coupled to said circuit means for producing a di-pulse in response to each change in the level of the binary signals, where each di-pulse includes first and second pulses of opposite polarities and where the sequence of the polarities of the first and second pulses in each di-pulse is indicative of the direction of the change in the level of the binary signals, means including a threshold responsive gating circuit coupled to said delay line for passing only the peaks of the first and second pulses in each di-pulse, and means including a bistable trigger circuit coupled to said gating circuit and having first and second states and responsive to the sequence of the polarity of the pulses in each di-pulse to become triggered to a particular one of the first and second states in accordance with such sequence, said gating circuit including a pair of unidirectional members connected between said magnetostrictive delay line and said trigger circuit and including means poled in opposite directions and coupled to said unidirecitonal members for reverse-biasing each of said pair of unidirectional members with a particular threshold potential for both bistable conditions of said trigger circuit to provide for a pasage of only the peaks of the first and second pulses in each di-pulse through the unidirectional members.

12. A memory apparatus, including a bistable circuit having two operating conditions, means coupled to said circuit for supplying to said circuit signals having first and second voltage levels to obtain an operation of said circuit in a first condition in response to changes of the signals from the first level to the second level and an operation of said circuit to a second condition in response to changes of the signals from the second level to the first level, means including a delay line coupled to said circuit for developing a di-pulse in response to each operation of said circuit where each di-pulse includes a pair of pulses of opposite polarities in a sequence and where the sequence of the polarities of the pulses in each di-pulse is indicative of the operation of said circuit in the first or second of the operating conditions, and means coupled to said delay line for determining the sequence of the polarities of the pulses in each di-pulse independently of the sequence of the polarities of the pulses in the preceding di-pulses.

13. In memory apparatus for binary digital information of the non-return-to-zero type wherein each apparatus includes circuit means for supplying binary signals in non-return-to-zero form whereby the level of the binary signals changes when successive binary digits differ and wherein such apparatus further includes a magnetostrictive delay line coupled to said circuit means for receiving the binary signals and for developing a di-pulse in response to each change in the level of the binary signals where each di-pulse includes a first pulse with a first polarity indicative of the direction of the change in the level of the binary signal and includes a second pulse with a second polarity opposite to the first polarity, the combination of: means including a threshold responsive gating circuit coupled to said delay line for passing only the pulse peaks of opposite polarity in each di-pulse, and means including a bistable triggering circuit coupled to said gating circuit and having first and second states of operation and responsive to the particular sequence of the polarities of the two pulses in each di-pulse for obtaining an operation of the triggering circuit to a particular one of the first and second states and for locking the bistable circuit to indicate the successive binary digits represented by the binary signals in accordance with the sequence of the polarities of the pulses in each di-pulse.

14. In memory apparatus for binary digital information of the non-return-to-zero type, wherein such apparatus includes circuit means for supplying binary signals in non-return-to-zero form whereby a change in the level of the binary signals occurs when successive binary digits differ, the combination of: means including a magnetostrictive delay line coupled to said circuit means for receiving the binary signals and for developing a di-pulse in response to each change in the level of the binary signals where each di-pulse includes a first pulse with a first polarity indicative of the direction of the change in the level of the binary signals and includes a second pulse with a second polarity opposite to the first polarity, means including a threshold responsive gating circuit coupled to said delay line for passing only the pulse peaks of opposite polarity in each di-pulse, means including a bistable triggering circuit coupled to said gating circuit and having first and second states of operation and responsive to the particular sequence of the two pulses in each successive di-pulse for triggering the bi-stable triggering circuit between the first and second states of operation and for locking the bistable circuit in response to the sequence of the pulses in each di-pulse to indicate the binary digits as represented by the binary signals, and means coupled to the binary triggering circuit for obtaining the production at multiples of a particular period of time of first and second output signals respectively representing the operation of the bistable circuit in the first and second states.

15. In memory apparatus for binary digital information of the non-return-to-zero type, wherein such apparatus includes circuit means for supplying binary signals in non-return-to-zero form whereby a change in the level of the binary signals occurs when successive binary digits differ, and wherein such apparatus further includes means including a magnetostrictive delay line coupled to said circuit means for receiving the binary signals and for developing a di-pulse in response to each change in the level of the binary signals, where each di-pulse includes a first pulse having a first polarity indicative of the direction of the change of the binary signals and includes a second pulse of second polarity opposite to the first polarity, the combination of: means including a threshold responsive gating circuit coupled to said delay line for passing only the pulse peaks of opposite polarity in each di-pulse, means including a bistable trigger circuit having first and second states of operation and coupled to said gating circuit and responsive to the particular sequence of the polarities of the successive pulses in each di-pulse for triggering the bistable trigger circuit between the first and second states and for locking the trigger circuit in response to the sequence of the polarities of the pulses in each di-pulse to obtain the response of the trigger circuit only to a particular one of the pulses in each di-pulse, and means coupled to said trigger circuit and synchronized with the presentation of the binary signals by said circuit means for sampling said trigger circuit to obtain the production of output signals corresponding to the operation of the trigger circuit in the first and second states and in timed relationship with the binary signals.

16. In memory apparatus including a bistable circuit having two operating conditions, and including means coupled to said bistable circuit for supplying binary digital signals to said circuit to obtain an operation of said circuit in one condition in response to binary signals indicating a first binary value and to obtain an operation of said circuit in the other condition in response to binary signals indicating a second binary value, the combination of: means including a magnetostrictive delay line coupled to said bistable circuit for developing a di-pulse in response to each operation of said circuit where each di-pulse includes a sequence of first and second pulses of opposite polarities and where the sequence of the polarities of the pulses in each di-pulse is indicative of the particular change in the operating condition of the binary circuit, means including a threshold responsive gating circuit coupled to said delay line for passing only the pulse peaks of opposite polarity in each di-pulse, and means including a bistable trigger circuit coupled to said gating circuit and having first and second states of operation and responsive to the particular sequence of the polarities of the pulses in each di-pulse to become triggered between the first and second states of operation in a pattern corresponding to the sequence of the polarities of pulses in each di-pulse and to become triggered in response to only a particular one of the two pulses in each di-pulse.

17. In memory apparatus including, a bistable circuit having two operating conditions and including first means coupled to said circuit for supplying binary digital signals to said circuit for operating said circuit in one condition in response to binary signals indicating a first binary value and for operating said circuit in its other condition in response to binary signals indicating a second binary value, and including means including a magnetostrictive delay line coupled to said circuit for developing a di-pulse in response to each operation of said circuit where each di-pulse includes a sequence of first and second pulses and where the sequence of the polarities of the pulse in each di-pulse is indicative of the particular change in the operating condition of the circuit, the combination of: means including a threshold responsive gating circuit coupled to said delay line for passing only the pulse peaks of opposite polarity in each di-pulse, and means including a bistable trigger circuit coupled to said gating circuit and having first and second states of operation and responsive to a particular one of the pulses in each di-pulse to become triggered from one bistable condition to the other, means coupled to said trigger circuit and synchronized with said first means for sampling said trigger circuit in synchronism with the supply of the binary digital signals from the first means to obtain the production of output signals in accordance with the bistable condition of the bistable trigger circuit and to correct for any variations in delay in said delay line.

18. In memory apparatus including means including a magnetostrictive delay line for developing a di-pulse in response to each voltage pulse introduced to the line, where each di-pulse includes a pair of pulses of opposite polarity in a sequence and where the sequence of the polarity of the pulses in each di-pulse is dependent upon the polarity of the voltage pulse introduced to the delay line, and including a source of voltage pulses and coupled to said line for introducing voltage pulses to said line where the polarities of the voltage pulses indicate a binary value, the improvement of: means coupled to said delay line for determining the sequence of the polarity of the pulses in each di-pulse, said last mentioned means including threshold responsive means coupled to said line for passing only the pulses in each di-pulse and including triggering means coupled to said threshold responsive means and having first and second conditions and triggered to the first condition for a first sequence of the polarity of the pulses in each di-pulse and triggered to the second condition for an opposite sequence of the polarity of the pulses in each di-pulse.

19. In memory apparatus for binary digital information of the non-return-to-zero type where such apparatus includes circuit means for supplying binary signals in non-return-to-zero form whereby a change in the level of the binary signals between first and second levels occurs when successive binary digits differ and where such apparatus further includes means including a magnetostrictive delay line coupled to said circuit means for producing a di-pulse in response to each change in the level of the binary signals, where each di-pulse includes first and second pulses of opposite polarities and where the sequence of the polarities of the first and second pulses in each di-pulse is indicative of the direction of the change in the level of the binary signals, the combination of: means including a threshold responsive gating circuit coupled to said delay line for passing only the peaks of the first and second pulses in each di-pulse, and means including a bistable trigger circuit coupled to said gating circuit and having first and second states and responsive to the sequence of the polarity of the pulses in each di-pulse to become triggered to a particular one of the first and second states in accordance with such sequence, said gating circuit including a pair of unidirectional members connected between said magnetostrictive delay line and said trigger circuit and including means poled in opposite directions and coupled to said unidirectional members for reverse-biasing each of said pair of unidirectional members with a particular threshold potential for both bistable conditions of said trigger circuit to provide for a passage of only the peaks of the first and second pulses in each di-pulse through the unidirectional members.

20. In memory apparatus including means including a magnetostrictive delay line for developing a di-pulse in response to each voltage pulse introduced to the line, where each di-pulse includes a pair of pulses of opposite polarity and where the sequence of the polarity of the pulses in each di-pulse is dependent upon the polarity of the voltage pulse introduced to the line and including a source of voltage pulses and coupled to said delay line for introducing voltage pulses to the line where the polarities of the voltage pulses indicate a binary value, the improvement of: threshold responsive means coupled to said delay line for passing only the pulses in each di-pulse and including triggering means coupled to said threshold responsive means and having first and second conditions and responsive to the pulses passing through the threshold responsive means to become triggered to the first condition for a first sequence of the polarity of the pulses in each di-pulse and to become triggered to the second condition for a second sequence of the polarity of the pulses in each di-pulse, the threshold responsive means including a pair of unidirectional members connected in an opposed relationship between the di-pulse developing means and the triggering means; and means coupled to said triggering means and synchronized with the introduction of voltage pulses from said source for periodically sampling the condition of said triggering means.

References Cited by the Examiner

UNITED STATES PATENTS

| | | | |
|---|---|---|---|
| 2,495,740 | 1/1950 | Labin | 340—173 |
| 2,926,217 | 2/1960 | Powell | 340—173 |
| 2,970,766 | 2/1961 | Epstein | 340—173 |

OTHER REFERENCES

Publication: Magnetostrictive Delay Line (by Federal Telecommunications Laboratories), Electrical Communications, vol. 28, pp. 46–53, March 1951.

IRVING L. SRAGOW, *Primary Examiner.*